June 30, 1925.
C. T. HIBBARD
FLEXIBLE FLYWHEEL
Filed Dec. 26, 1922
1,543,849
2 Sheets-Sheet 1
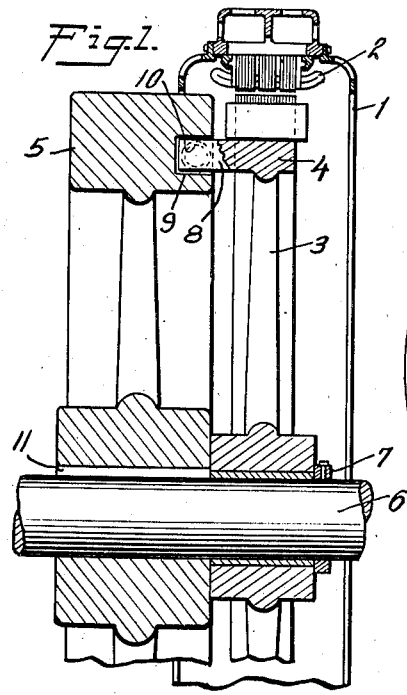
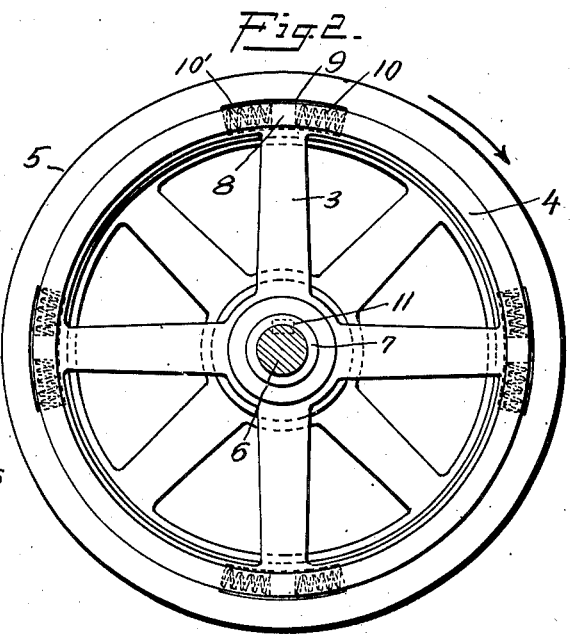
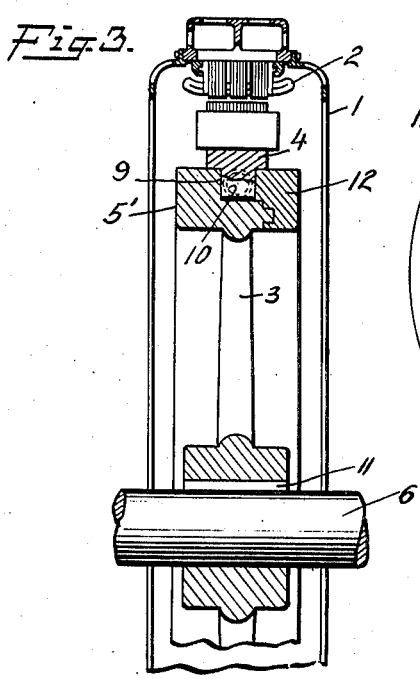
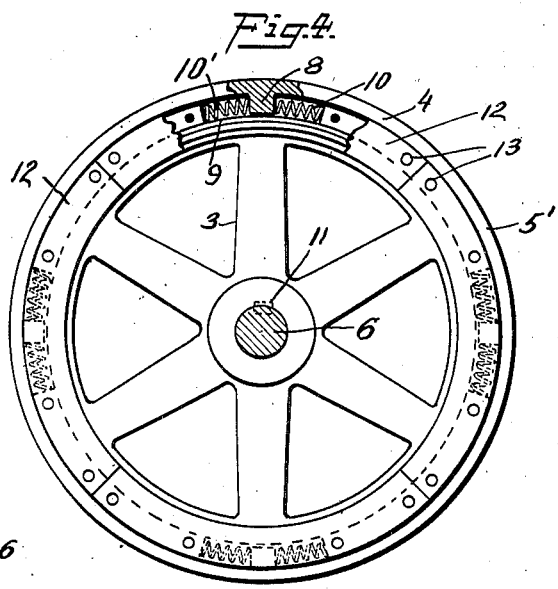
INVENTOR
Charles Truman Hibbard
BY
Lennie Davis Marvin & Edmonds
ATTORNEY June 30, 1925.
C. T. HIBBARD
FLEXIBLE FLYWHEEL
Filed Dec. 26, 1922
1,543,849
2 Sheets-Sheet 2
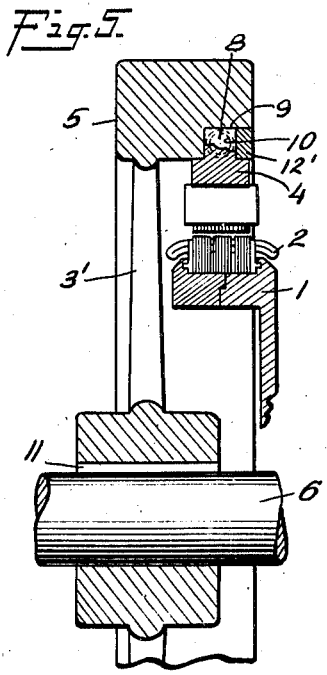
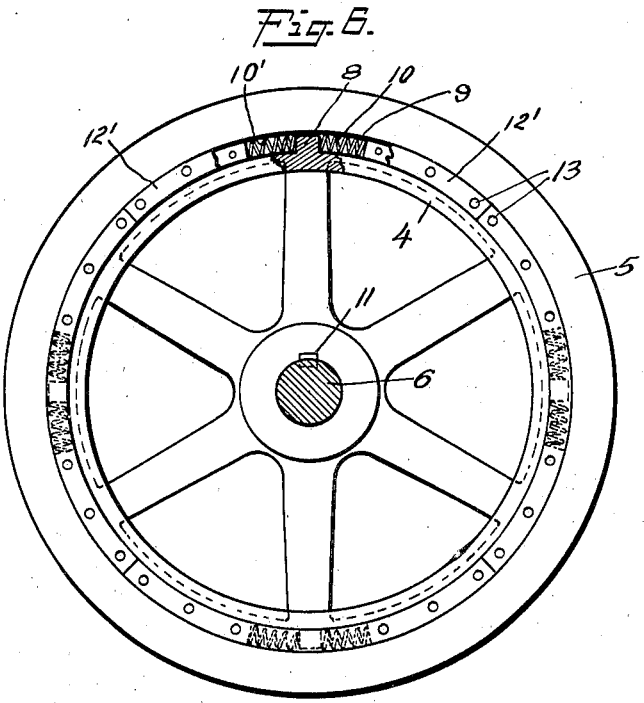
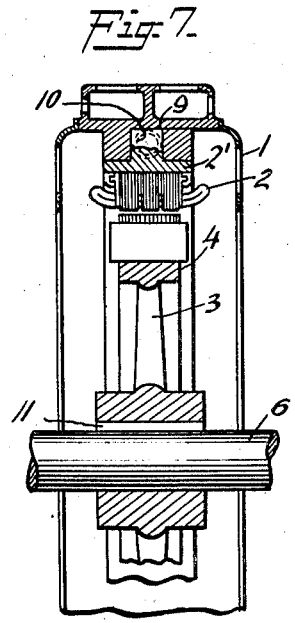
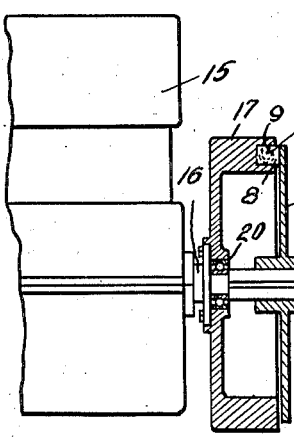
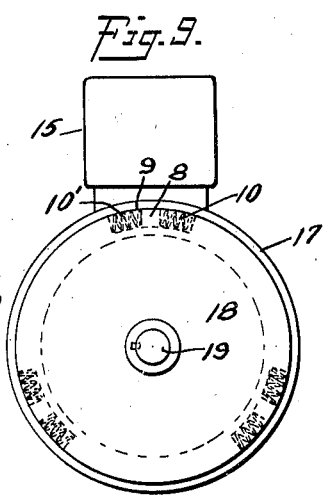
INVENTOR
Charles Truman Hibbard
BY
ATTORNEY Patented June 30, 1925.

1,543,849

UNITED STATES PATENT OFFICE.

CHARLES TRUMAN HIBBARD, OF MINNEAPOLIS, MINNESOTA.

FLEXIBLE FLYWHEEL.

Application filed December 26, 1922. Serial No. 608,973.

*To all whom it may concern:*

Be it known that I, CHARLES TRUMAN HIBBARD, residing at 14th Ave. northeast and Tyler St., Minneapolis, in the county of Hennepin, State of Minnesota, have invented certain new and useful Improvements in Flexible Flywheels; and I do hereby declare the following to be a full, clear, and exact description of the invention, such as will enable others skilled in the art to which it appertains, to make and use the same.

The present invention relates to a flexible mechanical coupling in combination with a fly-wheel. The principal object of the invention is to provide a means whereby two elements rotating at the same average speed may be interconnected in such a manner that the instantaneous speed of one element may differ from that of the other.

According to the usual practice, when two machines are direct-connected, a fly-wheel must be provided if either or both of them have a pulsating torque. For example, if an electric motor is connected to a load having a pulsating torque the instantaneous speed of the motor shaft will change with the torque of the load, and unless a fly-wheel is provided, the operation of the motor will be very unstable. The current supplied to the motor when the load torque is a maximum, is very great, and it is often impossible to make a motor operate under such conditions. This difficulty can be overcome to a certain extent by using a fly-wheel, the function of the fly-wheel being to dampen the fluctuations in the instantaneous speed of the machines. If a fly-wheel is used with the above mentioned motor, the fly-wheel supplies energy to the load when the load torque is a maximum, and when the torque is a minimum the motor supplies energy to the fly-wheel. Energy is thus stored in the fly-wheel when the torque is low, and delivered to the load when the torque is above the average. The effect of the fly-wheel is to reduce the variation in the instantaneous speed by forcing the load to operate at a nearly uniform rate.

It is a matter of common knowledge that, although fly-wheels can be used very advantageously in many instances, yet they are not entirely satisfactory. There are a great many conditions under which a fly-wheel cannot adequately overcome the effects of a pulsating torque. For example, the field of application of many modern machines, synchronous motors for example, is limited solely by the fact that suitable fly-wheel effect cannot be obtained. Another striking illustration is the large number of alternators in power generating stations that cannot be operated in parallel satisfactorily, due to the resonance effects that cannot be eliminated by using fly-wheels of practical dimension. In all of these cases, separate fly-wheels cannot be used to advantage for the reason that the fly-wheel effect necessary is so great that a fly-wheel possessing the required moment of inertia would not be practical on account of its size and the difficulty encountered in setting it in motion.

Referring to the above mentioned illustration of the motor driving a load having a pulsating torque, if, for example, the load is connected to the motor shaft, it is apparent that the effect of a fly-wheel is to make the shaft rotate at such a uniform speed that the operation of the motor will not be disturbed by the pulsating torque of the load. A certain amount of fly-wheel effect is ordinarily required by the load, but this portion of the total amount of inertia required is very small. By far the greater portion of the fly-wheel effect is required in order to make the shaft rotate at such a uniform speed that the motor will operate properly. It is therefore obvious, that if it were possible to transmit power from the motor to the load in such a manner that the instantaneous speed of the load may vary without correspondingly affecting the instantaneous speed of the motor, then only a very small amount of fly-wheel effect would be necessary. The only momentum required would be that necessary for the load itself.

By means of the present invention the above mentioned result is obtained. The necessity for a large fly-wheel is eliminated by transmitting power in such a manner that the effect of the pulsating torque is confined to the machine element in which it is produced. This result is obtained by the use of springs or other flexible means, which absorb the shock of the pulsating torque and through which power can be transmitted. This flexible coupling or arrangement of springs, is used in conjunction with a fly-wheel having a relatively small moment of inertia.

As applied to the motor driving the load having a pulsating torque, the invention would consist of a relatively small fly-wheel rigidly connected to the load shaft, and a number of springs arranged around the periphery of the fly-wheel, the motor transmitting power to the load through the springs and fly-wheel. In this case the fly-wheel should be only large enough so that the variation in the instantaneous speed of the load shaft would not be objectionable from the standpoint of the load requirements. The variations in the instantaneous speed of the load, would not effect the motor, for they would be absorbed by the springs and fly-wheel. The speed of the motor would therefore be uniform, and there would be no danger of the motor drawing excessive current at any instant during a revolution, or of the motor dropping its load.

The field of application of the present invention is practically unlimited. As applied to the operation of electric motors and generators, the invention is invaluable. Synchronous motors may now be used for a multitude of purposes for which they could not be used heretofore. Prior to this invention, synchronous motors could not be used to the best advantage for driving loads having a pulsating torque due to the fact that these motors must operate at synchronous speed. The flexible fly-wheel construction can also be used to great advantage with all types of induction, and direct current motors, driving machines in which extreme torque variations are produced. Induction motors having small slip, and therefore high efficiency, can now be used under conditions that heretofore required a motor having a large slip. The invention is of great value when used with electric generating equipment. Alternators which heretofore could not be operated in parallel due to resonance conditions, may now be operated satisfactorily, for the pulsations of reciprocating prime movers are almost completely damped out by the flexible fly-wheel. Direct current generators may now be driven by slow speed reciprocating engines, such as internal combustion engines, without using massive fly-wheels in order to prevent fluctuations in the voltage.

The present invention may also be used to very great advantage with numerous machines other than electric motors and generators. For example, a gas engine or any internal combustion engine, may be provided with a fly-wheel which is flexibly connected to its shaft, so that the explosion shocks will be cushioned and distributed over a longer period of time than is possible with a rigid fly-wheel. Obviously, automobile motors can be thus equipped with a flexible fly-wheel.

It is therefore to be understood that the present invention is not limited to any class of machinery, but may be applied in all cases where fly-wheels are now used, and it may be used in a great many instances where it is impossible to use an ordinary fly-wheel.

Several embodiments of the invention are illustrated in the accompanying drawings in which Fig. 1 is a partial section view showing one form of the invention as applied to a dynamo electric machine, the rotor of the dynamo being connected to a fly-wheel by a number of springs.

Fig. 2 is a detail view of the principal elements of the combination shown in Figure 1.

Fig. 3 is a partial section view showing another form of the invention as applied to a dynamo, in which the fly-wheel effect is supplied by the rotor spider.

Fig. 4 is a detail view of the principal elements shown in Figure 3.

Fig. 5 is a partial section view showing a combination of the improved fly-wheel and a dynamo, in which the fly-wheel partially encloses the stator.

Fig. 6 is a detail view of the rotating elements shown in Figure 5.

Fig. 7 is a partial section view showing an embodiment of the invention in which the stator winding of a dynamo is flexibly connected to the stator frame.

Fig. 8 is a partial section view of an embodiment of the invention as used with a reciprocating engine.

Fig. 9 shows another view, partly in section, of the elements shown in Figure 8.

Referring to Figures 1 and 2 of the drawing, a dynamo is shown, having a stationary frame 1 supporting an armature winding 2, and a rotor spider 3 supporting a rotating field structure 4. A fly-wheel 5 is fixed to the rotor shaft 6 by means of a key 11, the fly-wheel 5 being in close proximity to the rotor. The rotor spider 3 is not keyed to the shaft 6, but is rotatably mounted thereon, being held in place by the fly-wheel 5 and a collar 7 fixed to the shaft 6. On the periphery of the rotor spider 3, a number of lugs 8 are provided. These lugs 8 project into slots 9 provided around the edge of the fly-wheel. A plurality of coil springs 10 and 10' engage the lugs 8 on the rotor spider, and the ends of the slots 9, thus providing a flexible connection between the rotor and fly wheel 5.

If the dynamo shown in Figure 1 is used as a motor, driving a load in which a pulsating torque is developed, the shaft 6 is rigidly connected to the load in any suitable manner. When the load torque is a maximum, the fly-wheel will slow down for an instant while delivering energy to the load. If it is assumed that the fly-wheel and rotor rotate in the direction indicated by the arrow in Figure 2, then, when the load torque is a maximum and the fly-wheel has been thereby retarded, the leading springs 10 will be compressed and the corresponding lagging springs 10' will be expanded. This change in the spring tension will effect a slight change in the instantaneous speed of the rotor. This change in rotor speed, however, will be very slight in comparison with the change in the fly-wheel speed, and the pulsation of the motor will be distributed over a large portion of the revolution. After the peak of the load torque has passed, the leading springs 10 will gradually expand and accelerate the fly-wheel. Thus it is apparent, that, while the rotor and fly-wheel maintain the same average speed, yet the angular displacement of the fly-wheel with respect to the rotor varies considerably. This variation may be as much as 5% or 10%. The fluctuations in the instantaneous speed of the fly-wheel are comparatively great, while the corresponding fluctuations in the rotor speed are very small and are distributed over a relatively long period of time. Thus the motor may drive a load having extreme torque pulsations, and yet operate under practically ideal conditions as far as the characteristics of the motor are concerned.

If the machine shown in Figures 1 and 2 is used as a generator, driven by a reciprocating prime mover, the operation is exactly the same as if the machine were used as a motor. The shaft 6 is rigidly connected to the prime mover and the pulsations are absorbed by the fly-wheel 5 and the springs 10 and 10' as in the previous illustration. The rotor speed is, therefore, practically constant, the rotor being almost completely shielded from the effects of the pulsations in the prime mover.

The modification illustrated in Figures 3 and 4 comprises a dynamo having a stationary frame 1 supporting an armature winding 2, and a rotor having a spider 3 fixed to the shaft 6 by means of a key 11. The rotor spider 3 is of somewhat massive construction having considerable metal disposed near its circumference as shown at 5'. The object of this heavy construction is to provide a rotor having a relatively large fly-wheel effect. The field structure 4 of the dynamo is flexibly mounted on the spider 3. A number of springs 10 and 10' engage lugs 8 on the field structure, and the ends of slots 9 in the rotor spider. It is thus apparent that the field structure 4 may move relative to the spider 3, this relative movement being controlled by the tension in the springs 10 and 10'. As shown in the drawing, the springs 10 and 10' are held in place by heavy cover plates 12 forming part of the spider 3, and secured in place by means of bolts 13.

It is obvious that the operation of this modification is substantially the same as that of the device shown in Figures 1 and 2. If the machine shown in Figures 3 and 4 is operated as a motor, the torque developed by the rotating field structure is transmitted by the springs 10 and 10' to the spider 3 and shaft 6. The pulsations of the load are absorbed by the spider 3 and springs 10 and 10' and do not affect the electrical operation of the motor. The construction shown in Figures 3 and 4 is better adapted for conditions requiring a relatively small fly-wheel effect, whereas the construction shown in Figures 1 and 2 is better adapted for conditions requiring a large fly-wheel effect.

In the embodiment illustrated in Figures 5 and 6, a fly-wheel 5 is shown fixed to a shaft 6 by means of a key 11. The spokes 3' of the fly-wheel are located to one side of the center line of the rim of the fly-wheel. The rim of the fly-wheel carries, on the inside thereof, the rotating field structure 4 of the dynamo. The stationary frame 1 of the dynamo carrying the armature winding 2 is partially enclosed by the fly-wheel 5. The rotating field structure 4 is flexibly attached to the fly-wheel 5 through springs 10 and 10' engaging lugs 8 on the field structure, and the ends of slots 9 in the rim of the fly-wheel. The springs 10 and 10' are held in place by cover plates 12' secured to the body of the fly-wheel rim by bolts 13.

The operation of this modification is obvious from the foregoing description of the machines illustrated in Figures 1 to 4 inclusive. This modification, shown in Figures 5 and 6, is especially adapted to be used with machines requiring a very large fly-wheel effect.

In the modification illustrated in Figure 7, a dynamo is shown, comprising a stationary frame 1 supporting an armature winding 2, a rotor spider 3 carrying a rotating field structure 4, and a shaft 6 to which the rotor spider 3 is fixed by a key 11. The armature structure 2', instead of being fixed to the frame 1 as is the ordinary practice, is flexibly mounted thereon. This flexible mounting comprises of a series of springs 10 engaging lugs on the armature structure 2 and the ends of slots 9 provided in the rigid frame 1. The principal difference between this construction and that shown in the other figures, is that the spring structure shown in Figure 7, does not rotate. In the other modifications shown the spring structure rotates.

In all of the modifications heretofore described, the main object is to provide a means whereby the variations in the instantaneous speed of the rotor winding with respect to the stator winding are reduced to a minimum. In the modifications shown in Figure 7 this object is attained as follows:

Assume, for example, that this machine is to operate as a motor driving a load in which torque pulsations are produced. As the torque increased to a maximum, the rotor will be retarded and the stator winding structure 2 will compress the springs 10, and change its angular position to compensate for the change in the rotor speed. Thus the instantaneous speed of the rotor with respect to the stator winding will remain substantially constant, and the pulsations of the load will be absorbed by the fly-wheel effect of the rotor, and springs 10.

In the modification illustrated in Figures 8 and 9 a machine 15 is shown. This may be any engine, such as an internal combustion engine, in which a pulsating torque is produced, or it may be a driven machine in which torque pulsations are produced. To the shaft 16 of this machine 15 is fixed a fly-wheel 17 of any suitable shape and dimensions. This fly-wheel is flexibly connected to a member 18 which is fixed to a shaft 19 in any suitable manner. The shaft 19 is shown supported at the center of the fly-wheel by a suitable bearing 20. Lugs 8 are provided near the circumference of the member 18. These lugs 8 engage springs 10 and 10' mounted in slots 9 in the rim of the fly-wheel.

It is obvious that the object of this construction is to provide a means whereby the pulsations produced in the machine 15 may be so confined therein, that the shaft 19 may rotate at a uniform speed. The pulsations are absorbed in the fly-wheel 17 and the springs 10 and 10'.

From the foregoing description it is apparent that the arrangement, size and proportions of the parts may be varied without departing from the principle of the invention which is not confined to the particular embodiments shown and described, but is intended to cover such modifications thereof as fall within the scope of the appended claims.

I claim:

1. In combination with an electric motor having a rotor and a stator, a driven machine, a rotary element rigidly connected to said driven machine and mounted directly adjacent to the rotor of said motor, said element having an appreciable moment of inertia, and flexible means directly connecting the said rotary element with the adjacent side of said rotor.

2. The combination of a machine in which a pulsating torque is developed, a rotary element rigidly connected to said machine, said element having an appreciable moment of inertia, a dynamo, and a plurality of coiled springs concentric with said rotary element and directly interconnecting said element and the rotor of said dynamo.

3. The combination of a machine in which a pulsating torque is developed, a dynamo having a two part rotor, one of said parts having an appreciable moment of inertia, and this part being rigidly connected to said machine, and a plurality of springs interposed between the two parts of said rotor.

In testimony whereof I affix my signature.

CHARLES TRUMAN HIBBARD.